Figure 1:
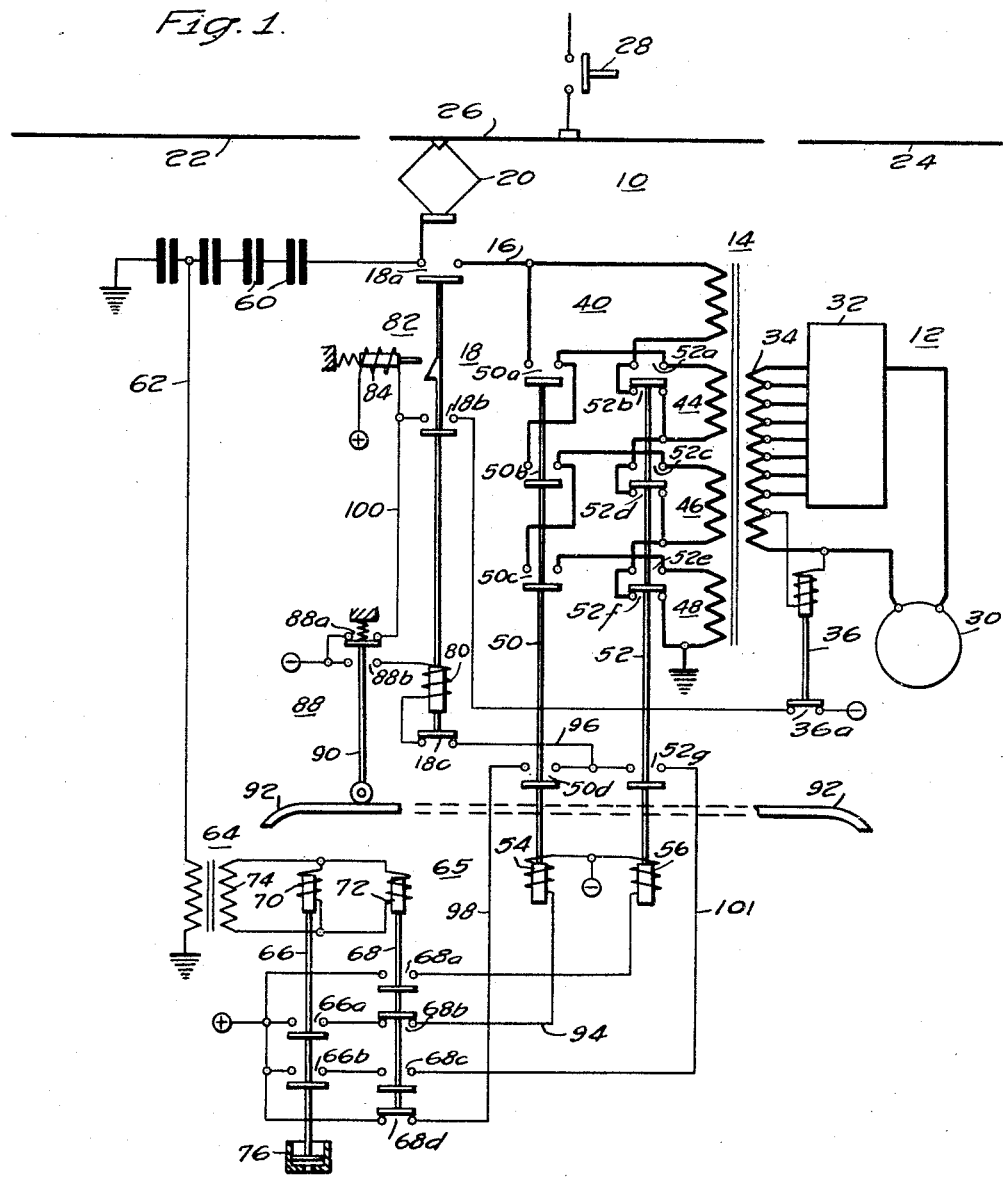

May 5, 1942.    C. C. WHITTAKER    2,281,734
TRANSFER SYSTEM FOR ELECTRICALLY OPERATED VEHICLES
Filed May 31, 1940    2 Sheets-Sheet 1

WITNESSES:

INVENTOR
Charles C. Whittaker.
BY
ATTORNEY

May 5, 1942.  C. C. WHITTAKER  2,281,734
TRANSFER SYSTEM FOR ELECTRICALLY OPERATED VEHICLES
Filed May 31, 1940  2 Sheets-Sheet 2

WITNESSES:
E. A. McCloskey
F. V. Giolma

INVENTOR
Charles C. Whittaker
BY
Crawford
ATTORNEY

Patented May 5, 1942

2,281,734

UNITED STATES PATENT OFFICE 2,281,734

TRANSFER SYSTEM FOR ELECTRICALLY OPERATED VEHICLES

Charles C. Whittaker, Pittsburgh, Pa., assignor to Westinghouse Electric & Manufacturing Company, East Pittsburgh, Pa., a corporation of Pennsylvania Application May 31, 1940, Serial No. 338,080

15 Claims. (Cl. 171—97)

My invention relates, generally, to control systems, and it has reference, in particular, to a transfer system for an electrically operated vehicle which obtains electrical energy from a trolley conductor system having a plurality of sections energized at different voltages.

Generally stated, it is an object of my invention to provide in a simple and effective manner for operating an electrically operated vehicle from a trolley conductor system in which the adjacent sections thereof may be energized at different voltages.

More specifically, it is an object of my invention to provide for controlling the connection between a current collector and a motor control circuit on an electrically operated vehicle in accordance with the voltage of the trolley conductor engaged by the current collector.

Another object of the invention is to provide for controlling the connections between the primary windings of a transformer supplying energy to a motor control circuit on an electrically operated vehicle as the vehicle moves from a section in which the trolley conductor is energized at one voltage to an adjacent section where the trolley conductor is energized at a different voltage.

A further object of the invention is to provide for automatically changing the connections of a transformer supplying electrical energy to a motor control circuit of an electrically operated vehicle in accordance with the voltage of the section of the trolley conductor engaged by the current collector of the vehicle so as to apply a predetermined voltage to the motor control circuit, though adjacent sections of the trolley conductor are at different voltages.

According to my invention, when it is desired to operate an electrically operated vehicle over a trolley conductor system having adjacent sections energized at relatively widely differing voltages, a dead section of trolley conductor of suitable length may be provided between the two sections. Suitable switch and control means may be provided for disconnecting the current collector of the vehicle from the power system thereof as the current collector approaches the end of one of the sections of trolley conductor. Voltage measuring means may be connected to the current collector to provide a control voltage having a predetermined relation to the voltage of the trolley conductor engaged by the current collector. Transfer means may be provided for changing the connections between the current collector and the motor control circuit of the vehicle for maintaining a substantially constant predetermined voltage on the motor control circuit regardless of the voltage of the trolley conductor. By controlling the operation of the transfer means through voltage responsive means energized by the control voltage, the transfer means may be made to operate as the current collector engages the adjoining section of the trolley conductor so as to connect the motor control circuit to the current collector for applying the predetermined voltage thereto.

Figure 2:
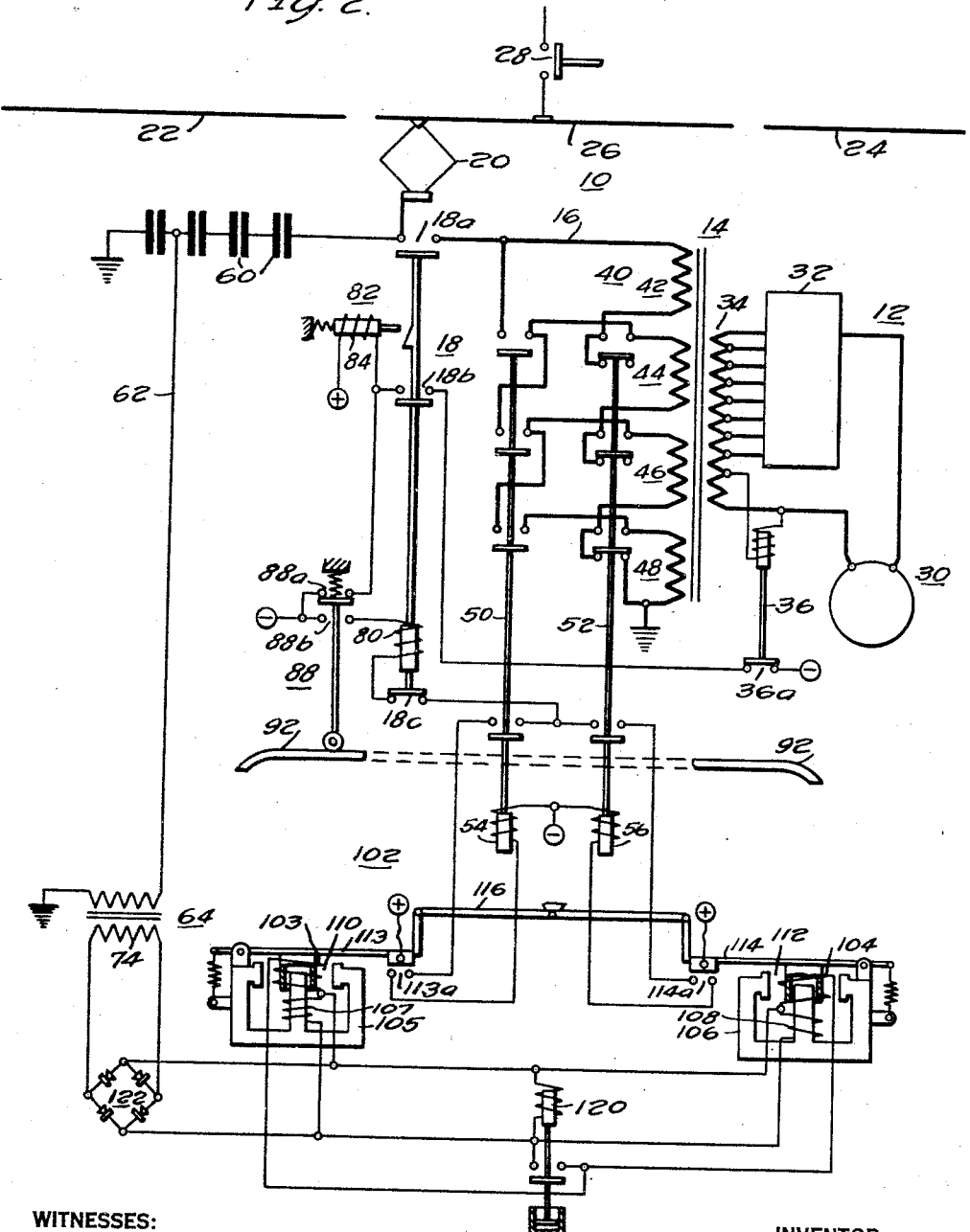

For a more complete understanding of the nature and scope of my invention, reference may be had to the accompanying drawings, in which:

Figure 1 is a diagrammatic view of a power system for an electrically operated vehicle embodying the principal features of my invention; and Fig. 2 is a modification of the system shown in Fig. 1.

Referring to Fig. 1 of the drawings, the reference numeral 10 may denote, generally, a power system for an electrically operated vehicle, wherein a motor control circuit 12 may be connected by means of a transformer 14 to a power bus 16. A suitable main switch or circuit breaker 18 may be utilized for connecting the power bus 16 to a current collector 20 on the vehicle, which is disposed to engage a trolley conductor comprising adjacent sections 22 and 24, which may be energized at different voltages. A "dead" or normally deenergized section of trolley conductor 26 may be provided between the adjacent energized sections 22 and 24, and suitable means, such as the switch 28 may be provided for energizing the "dead" section in case of emergency.

The motor control circuit 12 may be of any suitable type comprising, for example, a motor 30 and a motor control device 32 of any type well known in the art for connecting the motor to the taps of the secondary winding 34 of the transformer 14 for controlling the speed thereof. Only one motor has been shown but it is to be understood that a plurality of motors are usually used on a vehicle of this kind. A protective device, such as the no-voltage or under-voltage relay 36, may be connected to the motor control circuit for insuring that the current collector is disconnected from the power bus 16 when for any reason there is no voltage on the motor control circuit or the voltage is below a predetermined value.

In order to provide for applying a substantially constant predetermined voltage to the motor control circuit 12, regardless of the difference in voltage between the sections 22 and 24 of the trolley conductor, the primary winding of the transformer 14 may comprise a plurality of separate windings or sections which may be connected by a means such as the transfer switch 40 to give different ratios of transformation corresponding to the different voltages on the trolley conductor. For example, the primary winding of the transformer 14 may comprise the separate sections 42, 44, 46 and 48, which may be connected in either parallel or series circuit relation by the transfer switch 40 comprising control switches 50 and 52 having operating windings 54 and 56, respectively.

With a view to controlling the operation of the control switches 50 and 52 in accordance with the voltage of the trolley conductor, suitable means may be provided for producing a control voltage having a predetermined relation to the voltage of the section of the trolley conductor engaged by the current collector. For example, a plurality of condensers 60 may be connected in series circuit relation between the current collector 20 and ground, and a tapped connection 62 taken therefrom to apply a reduced voltage to a control transformer 64, so as to provide a control voltage having a predetermined relation to the voltage applied to the current collector 20, from the trolley conductor.

Voltage responsive means 65, which may comprise the voltage relays 66 and 68, may be utilized to control the energization of the operating windings 54 and 56 of the control switches in accordance with the voltage of the trolley conductor. The voltage relays may be provided with operating windings 70 and 72, respectively, connected to be energized from the secondary winding 74 of the control transformer 64. The operating winding 70 may be designed to effect the operation of the relay 66 over a relatively wide range of control voltages, while the operating winding 72 of relay 68 may be so proportioned that it is ineffective to operate the relay 68 at a normal relatively low control voltage to which the relay 66 readily responds, requiring a relatively high control voltage for rendering it effective. The relay 66 may also respond to this relatively high control voltage. Suitable means may be provided for slightly retarding the operation of the voltage relay 66, such as, for example, the dashpot 76, so that at the higher voltage the relay 68 operates first.

The main switch 18 may be provided with an operating winding 80 and a latch device 82 for normally retaining it in the operated or closed position. A trip coil 84 may be utilized in a manner well-known in the art for releasing the latch device 82 to return the main switch 18 to the inoperative or open position and disconnect the current collector 20 from the power bus 16.

Suitable control means may be provided for controlling the energization of the trip coil 84 of the latch device 82 so as to open the main switch 18 as the current collector 20 approaches the end of an energized section of the trolley conductor, and prevent an arc being drawn by the current collector. An auxiliary switch 88 may be provided on the vehicle for this purpose and actuated manually or in any other suitable manner, such as by means of an arm 90 which projects from the vehicle to engage a stationary contact member or ramp 92, which may be positioned adjacent the end of the conductor 22, either alongside the track or in some other suitable position. The deenergization of the operating winding 80 of the main switch 18 may thus be effected automatically before the current collector 20 reaches the end of the trolley conductor 22.

In describing the operation of the transfer system shown in Fig. 1, it may be assumed that the voltage of the section 22 of the trolley conductor is 12 kilovolts, while that of the section 24 is 48 kilovolts. It is to be understood, however, that these voltages are used merely for the purposes of explanation, and the invention is not intended to be limited by these representations.

While the current collector 20 engages the section 22 of the trolley conductor, the control voltage produced by the secondary winding 74 of the control transformer 64 is sufficient to operate the voltage relay 66 to close its contact members 66a and 66b, and maintain it in the energized position, while it is insufficient to operate the voltage relay 68. An energizing circuit for the operating winding 54 of the control switch 50 is thus provided from the positive side of the control source through contact members 66a, contact members 68b, conductor 94, and operating winding 54 to the negative terminal of the control source. The control switch 50 is actuated thereby closing its contact members 50a, 50b, and 50c. By means of the contact members 50a, 50b, 50c, and the normally closed contact members 52b, 52d and 52f of the control switch 52, the sections 42, 44, 46, and 48 of the primary winding of transformer 14 are connected in parallel circuit relation.

The closure of contact members 50d of the control switch 50 completes an energizing circuit for the operating winding 80 of the main switch 18 from the negative terminal of the control source, through the normally closed contact members 88b of the auxiliary switch 88, which have not as yet been opened by the ramp 92, operating winding 80, contact members 18b, conductor 96, contact members 50d, conductor 98 and contact members 68d, to the positive terminal of the control source. The main switch 18 is thus actuated to the closed position, connecting the primary winding of the transformer 14 and power bus 16 to the current collector 20 through contact members 18a. The latch device 82 maintains the main switch 18 in the closed position, while the closure of the auxiliary contact members 18b sets up an energizing circuit for the trip coil 84. As soon as voltage is applied to the secondary winding 34 of the transformer 14, the no-voltage relay 36 is energized opening contact members 36a, thus preventing the closure of contact members 18b from tripping the latch device 82.

When the projecting arm 90 of the auxiliary switch 88 engages the stationary contact or ramp 92 adjacent the end of the section 22, as shown, an energizing circuit for the trip coil 84 of the latch device 82 is completed from the positive terminal of the control source through the trip coil 84, conductor 100, and the contact members 88a to the negative terminal of the control source. The latch 82 is released and the main switch 18 returns to the deenergized position, disconnecting the current collector 20 from the power bus 16. The current collector 20 may then leave the energized section 22 without drawing an arc and pass on to the "dead" section 26 of the trolley conductor. When the voltage on the current collector 20 becomes zero, the voltage relay 66 is deenergized. Contact members 66a and 66b open, interrupting the energizing circuit for the operating winding 54 of the control switch 50, so that the control switch also returns to the deenergized position.

When the current collector 20 engages the energized section 24 of the trolley conductor, a relatively high control voltage is applied to the operating windings 70 and 72 of the voltage relays 66 and 68 through the control transformer 64, sufficient to effect the operation of both of the relays. Because of the time delay dashpot 76 on the voltage relay 66, the voltage relay 68 operates first. Contact members 68a are closed, thus completing an energizing circuit for the operating winding 56 of the other control switch 52. Contact members 68b are opened, thus interrupting the energizing circuit for the operating winding 54 of the control switch 50 and preventing its energization upon the later closure of the contact members 66a of the voltage relay 66. The control switch 52 operates, closing its contact members 52a, 52c, and 52e, thus connecting the sections 42, 44, 46 and 48 of the primary winding of the transformer 14 in series circuit relation.

When the projecting arm 90 of the auxiliary switch 88 disengages the stationary contact or ramp 92, contact members 88b close. An energizing circuit for the operating winding 80 of the main switch 18 is thus completed from the negative terminal of the control source through contact members 88b, operating winding 80, contact members 18c, conductor 96, contact members 52g, conductor 101, contact members 68c, and contact members 66b to the positive side of the control source. The main switch 18 operates, connecting the current collector 20 to the power bus 16 and setting up a trip circuit for the trip coil 84 on the latch device 82 through the contact members 18b. The no-voltage or undervoltage relay 36 is energized and opens contact members 36a as soon as the motor control circuit is energized.

When the vehicle is operating in the reverse direction, and travelling from the energized section 24 to the energized section 22, the operation of the control switches 50 and 52 of the transfer switch 40 is controlled in a like manner by the voltage responsive relays 66 and 68, so as to properly connect the sections 42, 44, 46, and 48 of the primary winding of the transformer 14 to apply the predetermined operating voltage to the motor control circuit 12, regardless of on which section of the trolley conductor the vehicle is operating.

Referring to Fig. 2 of the drawings, the motor control circuit 12 may be connected in a similar manner by a transformer 14 and a main switch 18 to the current collector 20 of the vehicle. The operation of the control switches 50 and 52 of the transfer switch 40 for selectively connecting the sections 42, 44, 46 and 48 of the transformer primary windings may likewise be controlled by voltage responsive means to apply a predetermined operating voltage to the motor control circuit regardless of which section the current collector may be engaging.

The voltage responsive means 102, may, in this modification of the invention, comprise a relay having oppositely acting operating windings 103 and 104. Suitable means, such as the substantially E-shaped magnetic core members 105 and 106 may be associated therewith, having control windings 107 and 108 thereon, respectively, for producing predetermined magnetic fields in the air gaps 110 and 112. The control windings 107 and 108 may be connected to a source of control voltage having a predetermined relation to the voltage of the section of the trolley conductor engaged by the current collector, being, for example, connected to a rectifier bridge circuit 114, which may be energized from the secondary winding 74 of the control transformer 64 in the same manner as shown in Fig. 1.

The control winding 107 and the core member 105 may be designed so as to produce a stronger magnetic field in the air gap 110 at the control voltage produced when the current collector engages the section 22 of the trolley conductor, than is produced in the air gap 112 by the control winding 108, and effect saturation of the core member 105 at any higher voltage. The magnetic core member 106 may have a larger cross-section and the control winding 108 may have fewer turns than the control winding 107, so as not to produce saturation in the core member 106 when the higher control voltage is applied to the control winding.

The operating windings 103 and 104 may be positioned for movement in the magnetic fields created in the air gaps 110 and 112 by the control windings 107 and 108, respectively, being, for example, supported by pivoted armatures 113 and 114, which may be operatively connected by a pivoted balance beam 116, so as to permit movement of the armature in the opposite directions only. Suitable control means may be provided for controlling the energization of the operating windings 103 and 104, such as, for example, the time delay means 120, which may be disposed to connect the operating windings to the rectifier bridge circuit 122 after the magnetic fields produced by the control windings 107 and 108 are sufficiently established.

When the current collector 20 engages the section 22 of the trolley conductor, the voltage applied to the control windings 107 and 108 produces a relatively high flux density in the air gap 110 and a relatively low flux density in the air gap 112. Accordingly, when the time delay means 120 operates and connects the operating windings 103 and 104 to the rectifier bridge circuit 122, the force exerted on the operating winding 103 predominates over that on the operating winding 104, so that the contact members 113a close, completing an energizing circuit for the operating winding 54 of the control relay 50. The sections 42, 44, 46 and 48 of the transformer winding are thereby connected in parallel circuit relation for operation on the 12 kilovolt section 22 of the trolley conductor, in a manner similar to that described in connection with the system of Fig. 1.

When, however, the current collector passes from the section 22 of the trolley conductor on to the "dead" section 26, and thence to the 48 kilovolt section 24, the control voltage applied to the control windings 107 and 108 of the voltage responsive means 102 is proportionately greater. The magnetic core member 105 saturates, so that the force exerted on the operating winding 103 does not increase proportionately. Since the core member 106 has a larger cross section, it does not saturate, and the increase in the force exterted on the operating winding 104 is sufficient to overcome the force exerted on the operating winding 103. The contact members 114a close, while the contact members 113a open. An energizing circuit for the operating winding 56 of the control switch 52 is thus completed, while the energizing circuit for the operating winding 54 of the control relay 50 is interrupted. The sequence of operations in the transfer system is thereafter similar to that described in connection with Fig. 1, and the connections of the sections of the primary winding of the transformer are changed to a series circuit relation for operation on the 48 kilovolt section of the trolley conductor.

From the above description and the accompanying drawings, it will be apparent that by my invention I have, in a simple and effective manner, provided for automatically controlling the connections between the motor control circuit of an electrically operated vehicle and the current collector so as to apply a substantially constant operating voltage to the motor control circuit, regardless of the fact that the adjacent sections of the trolley conductor are energized at widely differing voltages. The transfer system disclosed in my invention may readily be applied to existing equipment with a minimum of expense and provides for positive and foolproof transfer of the motor control circuit connections. Thus, electrically operated vehicles may be readily operated in systems where it is desirable or necessary to utilize different sections energized at different voltages.

Since changes may be made in the above description, and different embodiments of the invention may be made without departing from the spirit and scope thereof, it is intended that all matters contained in the above description, or shown in the accompanying drawings shall be considered as illustrative and not in a limiting sense.

I claim as my invention:

1. A control system for an electrically-operated vehicle having a current collector for engaging a trolley conductor having adjacent sections at different voltages to supply electrical energy to a motor circuit of the vehicle comprising, switch means connecting the motor circuit to the current collector, additional switch means operable to control connections between the motor circuit and the current collector, means for providing a reduced control voltage proportional to the voltage of the trolley conductor, means operable to deenergize said switch means during the transition from one section to the adjoining one, and relay means selectively responsive to the value of the control voltage effective to effect operation of the additional switch means to apply a predetermined voltage to the motor circuit when the current collector engages an adjoining section.

2. The combination with a power system for an electrically-operated vehicle including a motor circuit and a current collector for engaging a trolley conductor having sections energized at different voltages, of means on the vehicle for producing a reduced control voltage proportional to the voltage of the trolley conductor, switch means controlling the voltage applied to the motor circuit, and a control relay energized by the control voltage operable immediately the collector engages a conductor section to effect an operation of the switch means in accordance with the voltage of said section of the trolley conductor to maintain a predetermined motor circuit voltage.

3. In a power system for an electrically-operated vehicle having a current collector for engaging a trolley conductor having adjoining sections at different alternating current voltages to supply electrical energy to a motor circuit, in combination, switch means connecting the current collector to a vehicle power system, additional switch means for changing the connections between the motor circuit and the current collector, means energized from the current collector for providing a reduced control voltage proportional to the voltage of the trolley conductor, voltage responsive means energized by the control voltage operable to effect operation of the additional switch means so as to change the connections between the motor circuit and the current collector when the current collector engages an adjoining section to apply substantially a predetermined voltage to the motor control circuit.

4. A control system for an electrically-operated vehicle having a current collector for engaging a trolley conductor having a plurality of sections at different voltages to supply electrical energy to a motor circuit of the vehicle comprising, a power bus, switch means operable to connect the current collector to the power bus, control means effective to render the switch means inoperative before reaching the end of one section, control switch means operable to change the connection of the motor circuit to the power bus, and additional means responsive to the voltage of the adjacent section of the trolley conductor effective to control the operation of the control switch means in accordance with the voltage of the adjacent section.

5. The combination with a power system for an electrically-operated vehicle having a current collector for engaging a trolley conductor with adjacent sections at different voltages for supplying electric power to a motor control circuit of the vehicle, of switch means operable to change connections between the current collector and the motor control circuit, additional switch means operable to effect the energization of the motor control circuit from the current collector, means for rendering said additional switch means inoperative as the current collector approaches the end of one section, voltage responsive control means energized from the current collector as it engages the adjacent section of the trolley conductor operable in response to the voltage of the trolley conductor to control the additional switch means in accordance with the voltage thereof to supply a substantially predetermined voltage to the motor control circuit.

6. A control system for an electrically-operated vehicle having a current collector for engaging a trolley conductor with adjacent sections of different voltages for supplying electrical energy to a motor control circuit of the vehicle comprising, a power bus, switch means operable to connect the current collector to the power bus, means for rendering the switch means inoperative, control means responsive to the voltage of the trolley conductor, and transfer means operable under the control of the control means to control the connection of the motor control circuit to the power bus in accordance with the voltage of the trolley conductor engaged by the current collector.

7. The combination in a transfer system for an electrically-operated vehicle having a current collector for engaging a trolley conductor in which adjoining sections are energized at different voltages to supply electrical energy to a motor control circuit of the vehicle through a transformer, of transfer means operable to change the connections to the transformer, means for producing a control voltage proportional to the voltage of the section of the trolley conductor engaged by the current collector, and voltage responsive means selectively operable in response to different values of control voltage to control the operation of the transfer means to apply a substantially predetermined voltage to the motor control circuit.

8. The combination with a trolley conductor system having separate sections energized at different voltages with a dead section therebetween for providing a smooth path for a current collector of an electrically-operated vehicle, of a transfer system for controlling the voltage applied to a motor control circuit of the vehicle from the current collector, comprising, a plurality of transformer windings connected between the motor control circuit and the current collector, switch means operable to control the connections of the transformer windings, and control means including a pair of operating windings energized in accordance with the voltage of the section of trolley conductor engaged by the current collector for effecting the operation of the switch means to apply a predetermined voltage to the motor control circuit.

9. A transfer system for controlling the voltage applied to a motor control circuit of an electrically-operated vehicle as the current collector of the vehicle travels from one section of a trolley conductor to an adjacent section at a different voltage comprising, switch means operable to connect the current collector to the motor control circuit, control means for rendering the switch means inoperative between adjacent sections of the trolley conductor, means for producing a control voltage proportional to the voltage of the section of the trolley conductor engaged by the current collector, transfer means operable to change the connections between the motor control circuit and the current collector, means for preventing operation of the switch means until the completion of the operation of the transfer means, and control means selectively responsive to different voltages effective to control the operation of the transfer means in accordance with the voltage of the adjacent section as the current collector engages it.

10. The combination with a power system for an electrically-operated vehicle including a motor control circuit energized through transformer means provided with a plurality of primary windings adapted to be connected by switch means having control means operable to render it inoperative to a current collector which engages a trolley conductor having adjacent sections positioned in spaced end to end relation and energized at different voltages, of means positioned adjacent the end of a section of the trolley conductor for effecting an operation of the control means, transfer means operable to change the connections of the primary windings of the transformer means, means for producing a control voltage having a predetermined relation to the voltage of the section of the trolley conductor engaged by the current collector, and relay means selectively responsive to the control voltage operable to effect an operation of the transfer means to apply a predetermined voltage to the motor control circuit.

11. In a control system for an electrically-operated vehicle having a motor control circuit energized from a current collector engaging a trolley conductor having adjacent sections in spaced end to end relation and energized at different voltages, in combination, transfer means operable to change the connections between the current collector and the motor control circuit, a source of control voltage having a predetermined relation to the voltage of the section of the trolley conductor engaged by the current collector, control means including a pair of relays having operating windings connected to the source of control voltage selectively operable in response to the control voltage to effect an operation of the transfer means so as to change the connections between the current collector and the motor control circuit to apply a predetermined voltage thereto.

12. The combination with a power system adapted to have different voltages applied thereto from sources of different voltage and which includes a motor control circuit operative under predetermined voltage conditions, of a control system comprising, a transfer switch operable to change the connections between the motor control circuit and the voltage sources, means for producing control voltages having predetermined relations to the voltages applied to the power system, control means responsive to at least one of the control voltages, additional control means responsive to at least another of the control voltages, time delay means for retarding the operations of one of the control means, and circuit means controlled by said control means for controlling the operation of the transfer switch so as to effect predetermined connections between the motor control circuit and the sources of voltage dependent on the voltages thereof.

13. In combination with a power system which is adapted to be connected to sources of power having different voltages and which includes a motor control circuit to which a predetermined voltage is to be applied, a transfer system comprising, means for producing a direct current control voltage having a predetermined relation to the voltage of the source to which the power system is connected, control means operable to control the connection between the motor control circuit and the source of power, and electromagnetic means controlling the operation of the control means including an armature, magnetic core portions and operating windings positioned on the core portions energized by the control voltages to actuate the armature in opposed relation, one of said windings being predominant at a predetermined voltage, and the core portion associated therewith being saturable at a higher voltage so that the other winding predominates at a higher voltage.

14. A voltage responsive control system comprising, a source of variable control voltage, an armature having contact members and armature windings operatively connected thereto, said armature windings being energizable to actuate the armature in opposite directions, a magnetizable core member associated with each armature winding, operating windings positioned on the core members connected to the source of control voltage, the operating winding on one of the core members being adapted to produce a predetermined degree of magnetization therein at a predetermined value of control voltage and effective to saturate the core member at a higher value of control voltage, the operating winding positioned on the other core member being adapted to produce a lesser degree of magnetization therein at the predetermined control voltage and a greater degree of magnetization at a higher control voltage, and time delay means operable after a predetermined interval of time to effect the energization of the armature windings so as to actuate the armature in a predetermined direction dependent on the value of the control voltage.

15. The combination with a power system on an electrically-operated vehicle which is energized from a trolley conductor having adjacent sections energized at different voltages and which includes a motor control circuit, transformer means connected thereto having a plurality of primary windings, a current collector for engaging the trolley conductor, and switch means operable to connect the current collector to the motor control circuit of a control system, comprising, means on the vehicle actuable to render the switch means inoperative, means positioned adjacent the end of a section of the trolley conductor to effect the actuation of said means, means energized from the current collector to produce a control voltage having a predetermined relation to the voltage of the trolley conductor, a transfer switch operable to change the connections of the primary windings of the transformer means, and control means responsive to the control voltage to effect selective operation of the transfer means to change the connections of the transformer windings in accordance with the voltage of the adjacent sections so as to apply a predetermined voltage to the motor control circuit.

CHARLES C. WHITTAKER.